United States Patent [19]

Watanabe et al.

[11] Patent Number: 4,698,650

[45] Date of Patent: Oct. 6, 1987

[54] RECORDING APPARATUS AND CASSETTE FOR RECORDING MEDIUM

[75] Inventors: Yoshitaka Watanabe, Tokyo; Toshiharu Mamiya, Kawasaki; Tadashi Ishikawa, Urawa; Takashi Endo, Tokyo, all of Japan

[73] Assignee: Canon Kabushiki Kaisha, Tokyo, Japan

[21] Appl. No.: 715,399

[22] Filed: Mar. 25, 1985

[30] Foreign Application Priority Data

| | | | |
|---|---|---|---|
| Mar. 28, 1984 | [JP] | Japan | 59-45843[U] |
| Mar. 28, 1984 | [JP] | Japan | 59-45844[U] |
| Mar. 28, 1984 | [JP] | Japan | 59-45845[U] |
| Mar. 28, 1984 | [JP] | Japan | 59-45846[U] |
| Mar. 30, 1984 | [JP] | Japan | 59-64955 |

[51] Int. Cl.[4] ........ G01D 15/24; B41J 11/58

[52] U.S. Cl. ........ 346/134; 355/14 SH; 271/4; 400/625

[58] Field of Search ........ 346/134; 355/3 SH, 14 SH; 271/4; 400/625

[56] References Cited

U.S. PATENT DOCUMENTS

| | | | |
|---|---|---|---|
| 4,089,402 | 5/1978 | Hyland | 400/625 |
| 4,511,904 | 4/1985 | Takahoshi | 346/134 |
| 4,558,326 | 12/1985 | Kimura | 346/140 PD |

*Primary Examiner*—E. A. Goldberg
*Assistant Examiner*—Mark Reinhart
*Attorney, Agent, or Firm*—Fitzpatrick, Cella, Harper & Scinto

[57] ABSTRACT

An ink jet recording apparatus with improved operational performance and compactness has a mounting section for a recording paper cassette, a mounting section for an ink cartridge, and an accommodating section for a printed recording paper each have an opening at the same side of the apparatus. Preferably, an operation section for use in operating the apparatus and a display section for displaying the operation state of the apparatus are also disposed at the above same side.

14 Claims, 13 Drawing Figures

RECORDING APPARATUS AND CASSETTE FOR RECORDING MEDIUM

BACKGROUND OF THE INVENTION

1. Field of the Invention

The present invention relates to a recording apparatus for recording such as character images on a recording medium such as a recording paper.

2. Description of the Prior Art

Conventionally, roll papers have generally been used as recording papers for a recording apparatus such as an ink jet printer (recording apparatus is referred to as printer hereinafter). Most of such printers are constructed such that a roll paper is set into the printer from the upper side and is withdrawn from the upper side. Therefore, other apparatuses can not be placed upon the top face of the printer, which is not advantageous in view of the reduction of space. Printers of another type are known in which a recording paper is withdrawn from the front side of the printer. This type of printers, however, have a problem that the setting of papers is difficult. Further, in the case that a roll paper is used, a cutter must be prepared. This further gives rise to a problem that a cut edge of the recording paper may become poor depending upon the structure of the cutter.

Alternatively, with such printers using a cut sheet paper, since the cut sheet paper is set into the printer one by one, there is a problem that operational simplicity is degraded.

It is common for the printers of these kinds to provide a stacker into which printed recording papers are stacked and accommodated. By virtue of recent developments in miniaturizing printers, the distance between the stacker and the recording section of the printer has become shorter and the portion of a recording paper is being fed into the stacker during printing. In contrast with this, almost all of the conventional stackers are usually mounted exposing outside of the printer. With this printer, if the printed recording paper is touched with hands, the print quality is extraordinarily damaged because ink is not dry. Moreover, since the stacker is mounted exterior to the printer, it results in a bulky size of the printer and in poor performance of accommodating recording papers.

As a further problem for these types of printers, since the paper feeder precision holds an important factor, it has been undesirable to touch the recording paper with hands before the printing is completely finished. For this reason, the printer has been constructed in such a way that the passage along which the recording paper is fed is convered with the frame. Therefore, print quality during printing can not be monitored. If the print quality can be monitored during printing, it is possible to carry out the printing more quickly, or to adjust the printing density, coloring or the like, if the printer can perform such adjustments, before the printing is completed.

Apart from the above, turning to a cassette applicable to printers of those types, that is, a cassette for accommodating a stack of plural cut sheet recording mediums, there arise the following problems. For instance, in the case that recording papers are set upside down into a paper feeder cassette, or in the case that recording papers differ in color or material, or other recording mediums are desired to be accomodated, it is required to take the previously set recording papers or mediums out of the cassette. However, in this case, a conventional cassette has generally been provided with an additional space other than the essential accommodation space so as to take out the recording sheets accommodated within the cassette by making full use of the additional space. This additional space leads to a bulky size of the paper feeder cassette as well as that of the printer itself. Alternatively, if such additional space is not provided, various disadvantages are brought about: That is, it is difficult to smoothly pull out hands due to the contact with the walls of the cassette, after the hands are inserted in the cassette for taking the recording papers; or the recording sheet is occasionally creased during such handling to thereby make the sheet impossible to be used again.

In such a paper feeder cassette, a known structure is that a tubular coil spring urging a recording sheet against a paper feeder roller via an intermediate plate of the cassette is provided for exerting a suitable frictional force between the roller of the printer and the recording sheet to be fed by the roller. The provision of the tubular coil spring however necessiates a certain housing space for it even if the spring is in the maximum compressed state. The space therefore limits the amount of recording sheets to be accommodated within the cassette. If the amount of recording sheets is intended to be increased, however in this case, the number of spring turns must be increased for enabling to resist against the weight of the recording sheets. Therefore, the height of the cassette becomes large, thereby preventing the miniaturization of the printer.

SUMMARY OF THE INVENTION

The present invention has been made in view of the above circumstances, and it is an object of the present invention to provide a recording apparatus and a recording medium cassette which can solve the above prior art problems independently or collectively.

More in particular, in view of the above prior art problems, it is a first object of the present invention to provide an ink jet recording apparatus in which the operational performance and compactness of the apparatus are improved and other apparatuses can be placed upon the top surface of the apparatus. The object is achieved by that mounting a cassette for accommodating a cut-sheet recording medium, pulling out a printed recording medium, and mounting an ink cartridge, are all made possible to be carried out respectively at the same side of the apparatus.

According to one aspect of the present invention in view of the first object, in an ink jet recording apparatus for recording with ink onto a cut-sheet recording medium, a cassette mounting section for use in mounting a cassette in which a plurality of recording mediums are to be accommodated, an ink cartridge mounting section for use in mounting an ink cassette in which ink is to be contained, and a pull-out section for pulling out a printed recording medium, are all provided with respective openings so as to open at the same side of the apparatus.

In a preferred embodiment, an operation section for use in operating the apparatus and/or a display member for displaying the operation state of the apparatus, and the like are also disposed at the above same side.

As above, the operational performance is improved, the ink jet recording apparatus can be placed within a limited space, and other apparatuses can be placed upon the top surface of the apparatus.

In view of the above prior art problems, it is a second object of the present invention to provide a recording apparatus in which a stacker for accommodating a printed recording medium is housed within the apparatus frame, a decrease in amount for the recording mediums to be accommodated, can be minimized which otherwise might be caused by the stacker within the apparatus frame, and in addition, other apparatuses can be placed upon the top surface of the apparatus frame.

According to another aspect of the present invention in view of the above object, the recording apparatus is provided with a stacker for accommodating a plurality of printed sheet-form recording mediums. The stacker comprises an upper plate having an even top surface; and a load surface for use in piling up a recording medium; wherein the top surface is substantially even with the top surface of the apparatus frame, and the load surface is inclined in such a way that the space between the upper plate and the load surface becomes narrower along the ejection direction of the recording medium.

With such arrangement, a possible touch with a recording medium from the upper side of the apparatus can be avoided so that it is possible to stop the deterioration of printing quality, and that in addition it is possible to place upon the apparatus other apparatuses and to place the apparatus within a limited space.

Moreover, since the space at the outlet portion of a recording section is broad, it is possible to accommodate a large number of recording mediums even if a medium curled in the direction perpendicular to the ejection direction of the recording medium, is ejected out. Further, the deterioration of printing quality or a jamming is not brought about which might occur as a recording medium under printing operation abuts upon the ejected recording medium.

The type of a recording apparatus is not intended to be limited to an ink jet printer, but other types of recording apparatuses such as thermal printer are of course applicable.

It is a third object of the present invention to provide a recording apparatus which not only can properly protect a recording medium, but also can monitor the finished print quality on a recording medium, with a simple arrangement.

According to a further aspect of the present invention in view of the above object, the recording apparatus comprises: recording means for recording a visual image onto a sheet-form recording medium; feeding means for feeding a recording medium to the recording means during the operation of the recording means; a guide member for guiding a printed portion of the recording medium; an apparatus frame for housing the recording means, feeding means, and guide member; wherein the guide member and at least the portion of the apparatus frame facing the guide member are transparent.

As above, during printing, the recording medium is reliably protected from the exterior so that the degradation of feeding precision for the recording medium due to external factors is avoided. Therefore, the deterioration of printing quality, jamming, oblique motion or the like can be prevented. Furthermore, since the printing conditions can be 5 monitored, it is possible to quickly print once more or to quickly adjust the printing conditions.

As to the above aspect, the type of a recording apparatus is not intended to be limited to an ink jet printer, but other recording apparatuses such as thermal printer are of course applicable.

In view of the above prior art problems, it is a fourth object of the present invention to provide a cassette for a recording medium, in which the pull-out of the recording medium can be effected using an extremely simple structure and the miniaturization of the apparatus can be attained.

According to a still further aspect of the present invention in view of the above object, the recording medium cassette for accommodating a plurality of sheet-form recording mediums is constructed such that a container for accommodating the recording sheet is formed at the bottom thereof with an aperture, and the recording medium can be pushed through the aperture and pulled out from the cassette.

With the above construction, the recording medium is loaded into or removed from the cassette without inserting hands within the cassette, as in the conventional case. Therefore, there is no chance for hands to touch the cassette, it is not difficult to pull out the last one piece of the recording medium, and a fold in the recording medium does not occur, thereby leading to a prominent improvement on the operational performance. Further, contrary to the conventional case, it is not necessary to prepare a large space for the cassette. An extraordinarily compact cassette can be realized having the size substantially the same as that of a recording medium. Consequently, it is very advantageous in that miniaturization and lightweighting of the overall recording apparatus, as well as the reduction in cost and the like can be attained.

In addition, by virtue of the formation of an aperture in the cassette bottom, the detection of the recording medium can be performed by positively utilizing the aperture, which results in repletion not only to the operational performance but also to the functional performance.

As to the above aspect too, the type of a recording apparatus is not intended to be limited to an ink jet printer, but various recording apparatuses such as electronic photocopier, thermal printer are applicable to the recording medium cassette.

It is a fifth object of the present invention to obviate the prior art problems and to provide a recording medium cassette in which the amount of recording mediums to be accommodated can be increased and the size of the cassette can be miniaturized.

According to a further aspect of the present invention in view of the above object, the recording medium cassette comprises a container for accommodating a plurality of sheet-form recording mediums, a movable plate member upon which the recording medium is piled up, and a spring member mounted between the plate member and the container for energizing the recording medium, wherein as the spring member a conical coil spring is used.

With such a arrangement, when the plate member or an intermediate plate is subjected to the maximum push-down pressure, the conical coil spring becomes to have a thickness corresponding to the coil diameter of the spring. Therefore, the space required for the coil spring while the intermediate plate is under the maximum pressure, is sufficient if only it has at the minimum a thickness corresponding to the thickness of the coil diameter. As compared with the conventional tubular type coil spring, a remarkable space reduction is attained. More in addition, although the spring force applied to the recording medium must be strengthened in order to obtain a large amount of recording medium to be accommodated, even in such case the space for the spring does not change. As a result, it is possible to miniaturize the cassette, which contributes to the miniaturization of the recording apparatus. Moreover, a surplus space can be enjoyed in the mounting and dismounting portion for the cassette to and from the recording apparatus. Thus, the mounting and dismounting operations become easy to be carried out. This necessarily leads to an extensive improvement on the operational performance of the cassette.

Furthermore, by varying the winding pitch of the conical coil spring, it is possible to maintain the contact pressure at the contact position with a recording medium feeding roller substantially constant, irrespective of the remaining amount of the recording mediums in the cassette. Therefore, it is possible to prevent the occurrence of jamming during the feeding operation. That is, it is attributable to an improvement on the reliability of the apparatus.

Also as to the above aspect, the type of an recording apparatus is not intended to be limited to an ink jet printer. It is apparent that various apparatuses such as electronic photocopier, thermal printer are also applicable to the cassette.

The above numerous aspects of the present invention as described above can naturally be combined as desired.

Many other objects, aspects, and features of the present invention will become manifest from the following detailed description with reference to the accompanying drawings of the embodiments.

BRIEF DESCRIPTION OF THE DRAWINGS

A preferred embodiment realizing the above various aspects of the present invention will be described with reference to the accompanying drawings, wherein.

DETAILED DESCRIPTION OF THE PREFERRED EMBODIMENT

(General Outline of Printer)

Figure 1:
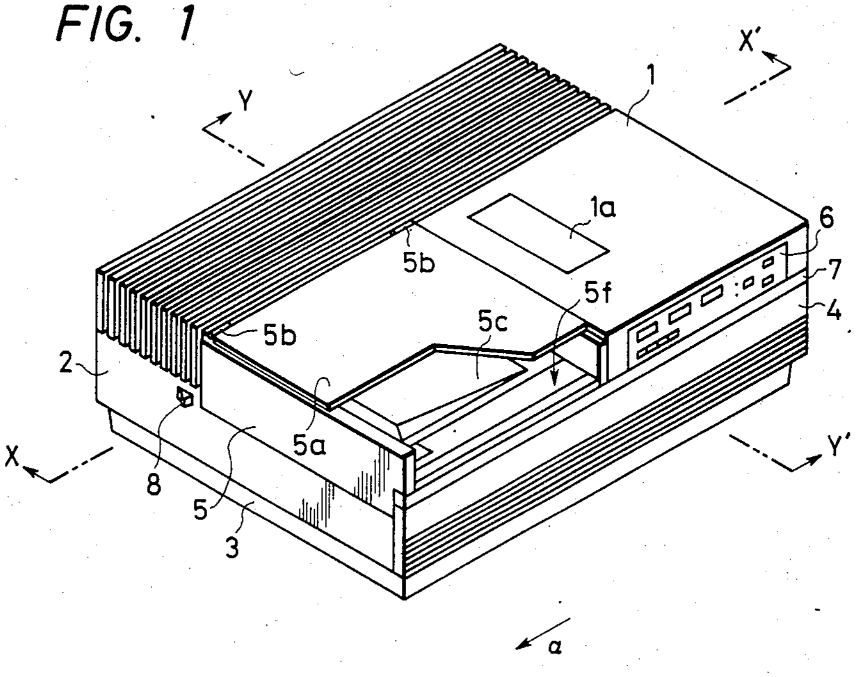
FIG. 1 is a front perspective view of the ink jet recording apparatus according to the embodiment of the present invention.

Referring now to FIGS. 1 to 4, numeral 1 represents an upper cover, numeral 2 represents a lower cover, numeral 3 represents a bottom cover, numeral 4 represents a front cover, and numeral 5 represents a stacker into which printed recording papers are automatically withdrawn and aecommodated. Numeral 6 represents an operation panel for the printer, and numeral 7 represents a stay cover which functions as a mechanical reinforcement and ornamental accent stripe.

On the upper cover 1, an upper plate 1*a* made of transparent material (such as acrylic resin) is fixedly attached so that the inner part of the printer can be seen through the plate 1. The plate 1 is provided so as to monitor the printing quality of a recording paper prior to the withdraw; for example, to monitor the coloring conditions in printing earlier than usual. Thus, it is possible to effect if necessary an earlier adjustment or the like.

Figure 2:
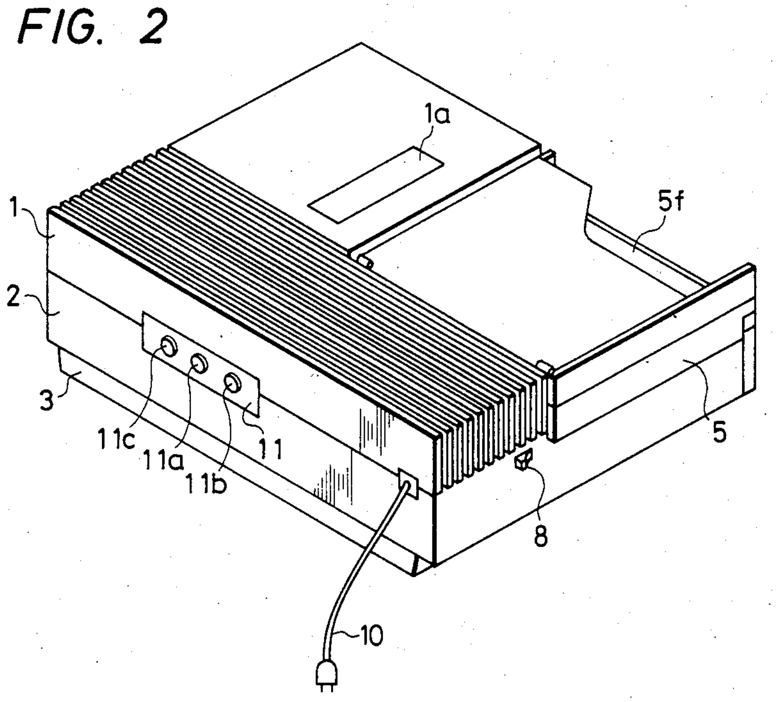
FIG. 2 is a rear perspective view of the apparatus of FIG. 1.

In FIG. 2, numeral 10 represents a power source cord, and numeral 11 represents an input source panel. In the input source panel 11 of the present embodiment, provided are a connector 11*a* for use in inputting NTSC signals, connector 11*b* for use in inputting R.G.B. color signals, and connector 11*c* for use in inputting such as character and image data from peripheral devices such as personnel computers.

Figure 3:
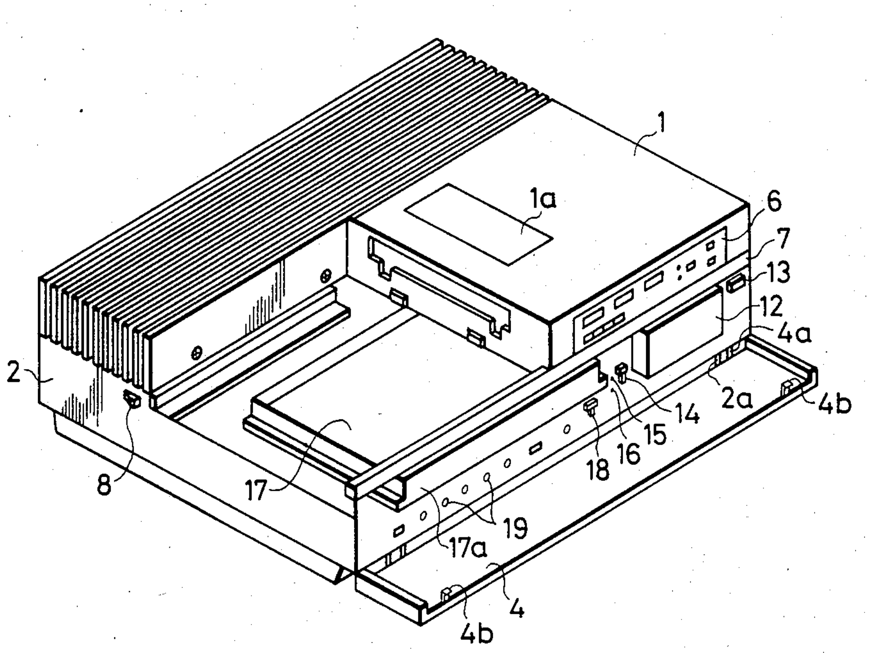
FIG. 3 is a perspective view of the apparatus of FIG. 1, wherein a front cover and stacker are dismounted from the apparatus.
Figure 6:
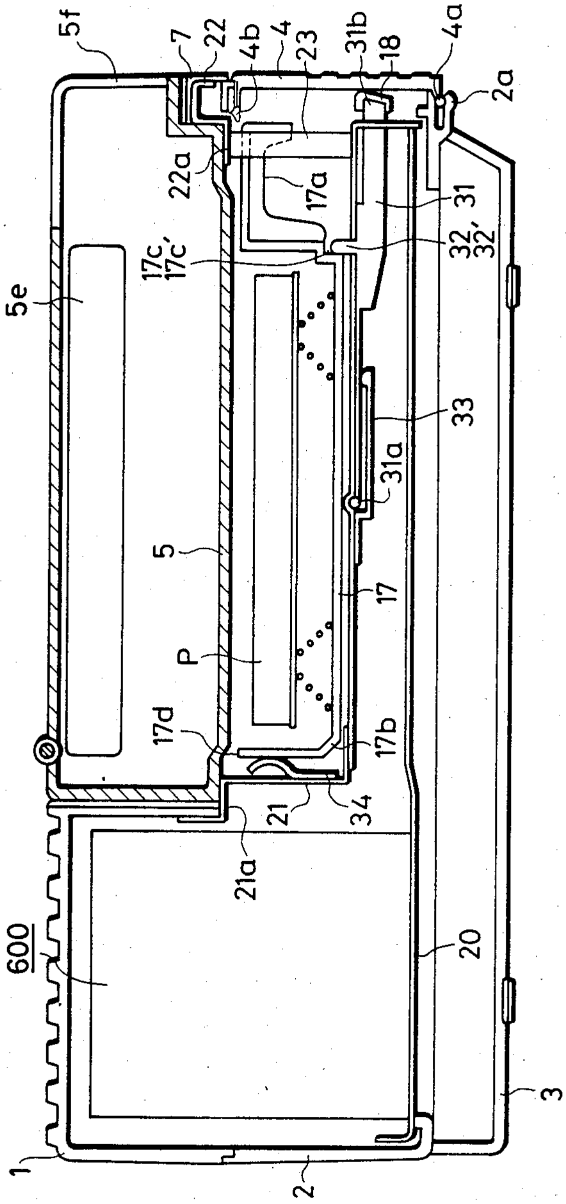
FIG. 6 is a cross sectional view cut along a line Y–Y' of FIG. 1.

As particularly shown in FIGS. 3 and 6, supporting shafts 4*a* of the front cover 4 are coupled to pivot sections 2*a* of the lower cover 2. The front cover 4 is mounted rotatable about the supporting shafts 4*a* and arranged such that hooks 4*b* engage with the stay cover 7.

The front cover 4 is automatically removed from the pivot sections 2*a* if the former is further rotated downward.

Figure 4:
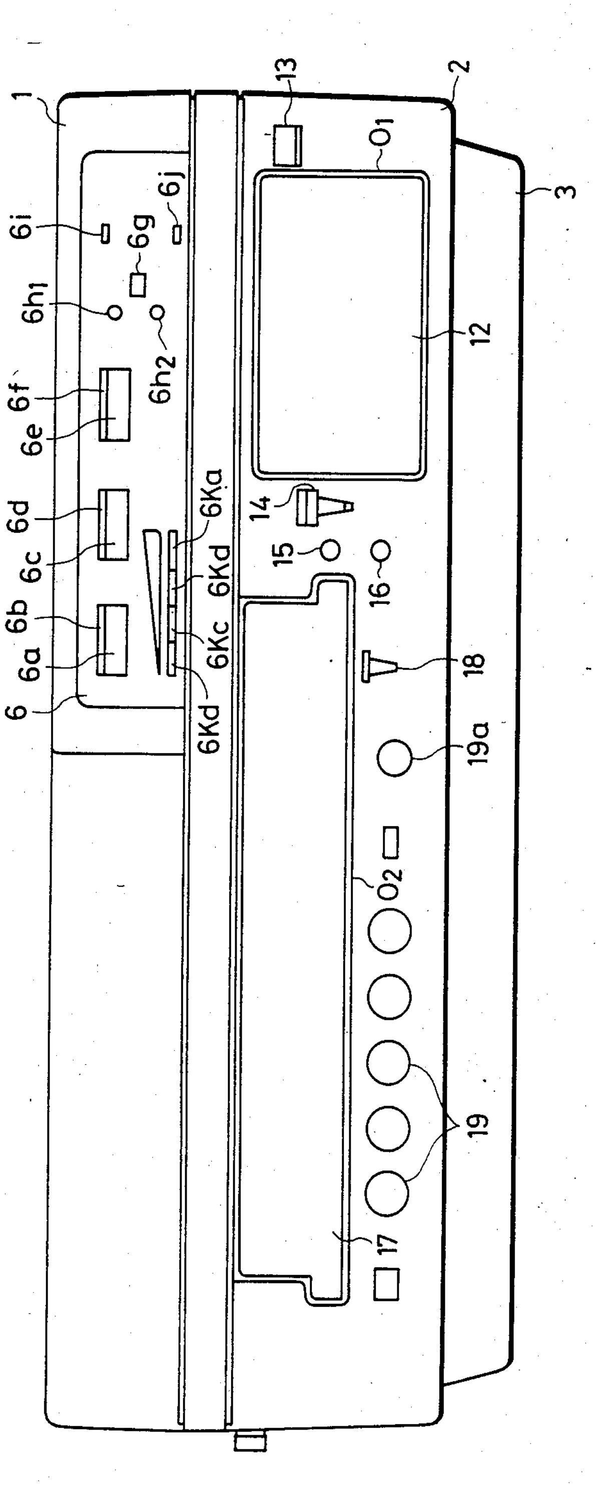
FIG. 4 is a view of the apparatus in the dismounted state of FIG. 3, as seen from the front or operation side.

In FIGS. 3 and 4, numeral 12 represents an ink cartridge, and numeral 13 represents a release knob for the ink cartridge. The ink cartridge 12 is inserted into the apparatus through an ink cartridge insertion opening 1 (FIG. 4) by directing the ink supply side of the cartridge to the inside of the apparatus. If the release knob 13 is swung downward as the ink in the cartridge 12 becomes empty, by virtue of the structure described later, the ink cartridge 12 is pushed forward a little. Therefore, the following pulling operation by the user makes it possible to remove the cartridge from the apparatus.

Numeral 14 represents a roller release knob for releasing a resist roller 103 and pinch roller 104, described later, from a platen 101. By sliding the roller release knob 14 downward, the resist and pinch rollers 103 and 104 are released from the platen 101. This release is effective if it happens some troubles such as paper clogging, and it is aimed at preventing tearing of papers within the printer while carrying out a jam disposal. In particular, since the rollers 103 and 104 are released from the platen, the jammed paper can be readily pulled out.

Numeral 15 represents a reset button for again bringing the resist roller 103 and pinch roller 104 into tight contact with the platen 101, the reset being enabled in this embodiment by pushing the reset button 15.

Numeral 16 represents a reset button for a residual ink amount counter. As the amount of ink within the ink cartridge 12 becomes insufficient for retaining a good printing, a display of "ink empty" is presented on a residual ink amount displaying LED 6K described later. In such a case, therefore, the user must mount a new ink cartridge 12 in place of the consumed ink cartridge 12 which is pulled out after swinging downward the ink cartridge release knob 13. At this time, as the reset button 16 for the residual ink amount counter is depressed, the counter which will be described later is reset.

Numeral 17 represents a paper feeder cassette. In the present embodiment, about 100 paper sheets can be set within the cassette 17. The cassette 17 can be inserted and mounted within the apparatus through an opening O2 (FIG. 4) with a pull 17*a* directing to the user side. Numeral 18 represents a paper cassette release knob. By swinging the knob 18 from the upper position to the lower position, the paper cassette 17 is slightly pushed to the user side. Thus, by pulling out the paper cassette 17 with the pull 17*a* grasped, the cassette 17 can be removed from the printer.

Numeral 19 represents operation members such as switches and adjustment knobs for use in such as switching over inputs and adjusting the printing quality.

Operation Panel

Next, the operation panel 6 will be described with reference to FIG. 4.

Reference 6*a* represents a power switch, reference 6*b* represents a light emission diode (referred to as LED hereinafter) for displaying the on/off state of the power switch, reference 6*c* represents a print start switch, reference 6*d* represents an LED for displaying the printing state, reference 6*e* represents a stop switch, reference 6*f* represents an LED for displaying the printing stop state, and reference 6*g* represents a switch for changing the print size which in the present embodiment can select either one of the two sizes, i.e., a larger one (L) and a smaller one (S). References 6*h*1 and 6*h*2 represent LEDs for displaying the print size, respectively, the former being indicative of the selection of the larger size (L) and the latter indicative of the smaller size (S). Reference 6*i* represents an LED for displaying the troubles on the recording paper, such as jammed papers and paper empty. Reference 6*j* represents an LED for displaying the dismount state of the ink cartridge 12. Reference 6*k* represents LEDs for displaying the amount of residual ink. In displaying the residual ink amount, although four LEDs 6Ka to 6Kd are used in the present embodiment, the number of LEDs may take any desired one.

As seen from the above description of the embodiment, the mounting sections for the ink cartridge 12 and paper cassette 17, a withdrawal section (stacker 5) for printed papers, and the operation section or panel including such as print start switch and the like, are all disposed at the front face of the apparatus. Therefore, the operations for the apparatus can be managed through only one side of the apparatus, resulting in an operational facility. Furthermore, it is possible to place other apparatuses near to both sides or on the upper side of the apparatus.

Outline of Printer

Figure 5:
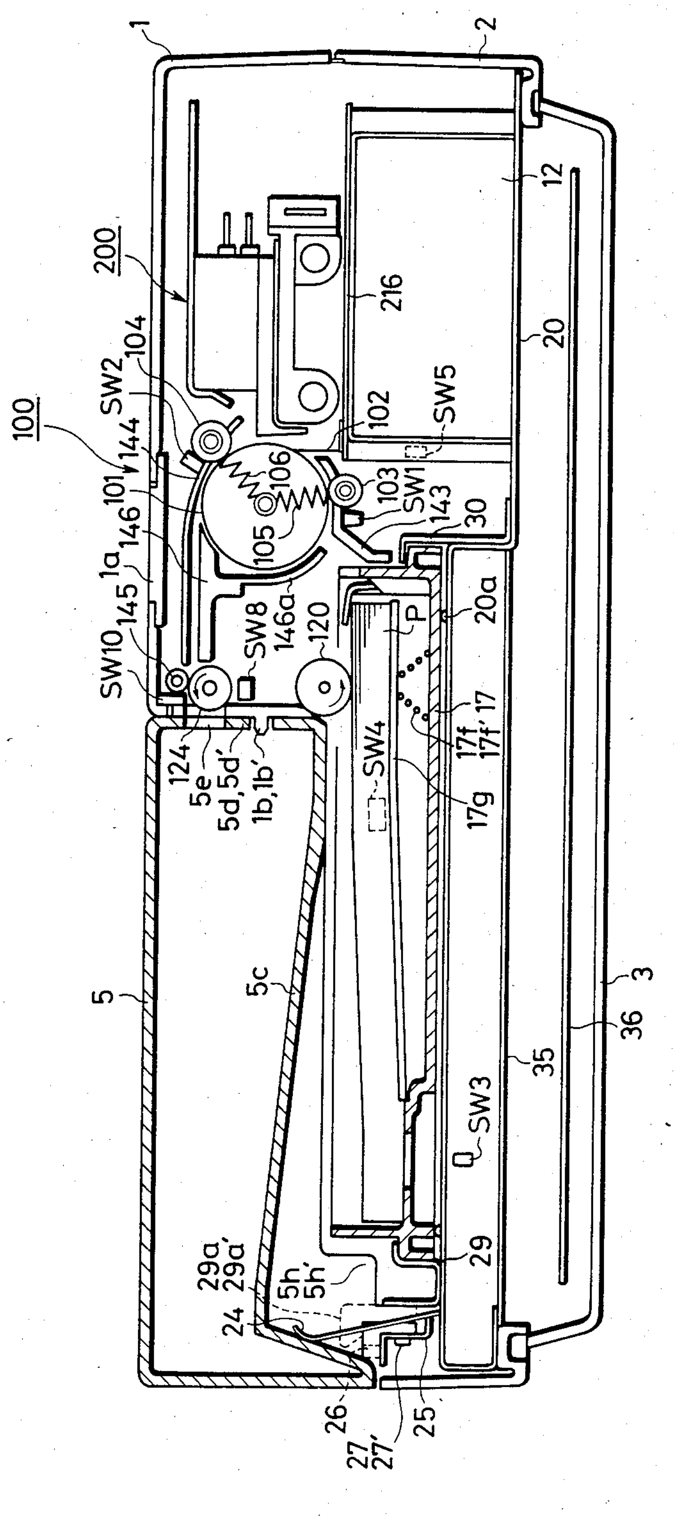
FIG. 5 is a cross sectional view cut along a line X–X' of FIG. 1.

In FIGS. 5 and 6, numeral 20 represents a main frame used as a base for the printer. Numeral 100 represents a paper feeder and withdrawal system associated mainly with the platen 101, and numeral 200 represents a head and ink supplying system. Both systems are supported on the main frame 20 and the description thereof will be given later. Numeral 21 represents a stacker guide, numeral 22 represents a stay, and reference 23 represents a stay supporting shaft, wherein the one ends of the stacker guide 21 and stay supporting shaft 23 are fixedly mounted to the main frame 20. The other end of the stay supporting shaft 23 is fixedly connected to the stay 22. The stacker 5 slides upon the stacker guide 21 and rail surfaces 21*a* and 22*a* of the stay 22 for movement therealong. Two engaging pins 1*b* and 1*b*′ are mounted on the upper cover 1, while engaging holes 5*d* and 5*d*′ are formed in the stacker 5. The position setting for the stacker 5 is determined by the structure that the hole 5*d* and the pin 1*b*, together with the hole 5*d*′ and the pin 1*b*′, are engaged with each other while the stacker 5 is mounted, thereby making a paper ejection outlet 5*e* not movable both up and down, right and left directions. Numeral 24 represents a leaf spring, numeral 25 represents a slide lever, numeral 26 represents a stop pin, and numerals 27 and 27′ represent guide shafts. The leaf spring 24 serves as a spring for pushing back the stacker 5 in the direction opposite to the pull-out direction thereof. The slide lever 25 is provided with the stop pin 26 fixedly mounted thereon and is disposed so as to slidable on the guide shafts 27 and 27′. In releasing the stacker 5, a stacker release knob 8 fixedly mounted on the slide lever 25 is simply slid rearward to effect the release of the stacker 5.

Numerals 29 and 30 represent cassette guides each fixedly mounted on the main frame. A protrusion 20*a* is locally mounted on the main frame 20, the position setting for the paper cassette 17 in the vertical direction being performed by the protrusion 20*a* and the cassette guides 29 and 30. In the present embodiment, the perpendicularity of a recording paper relative to the paper feeding direction and the axial direction of the platen roller 101 is ensured by the following structure. In particular, a cassette release lever 31 is provided with a pivot 31*a* and knob attaching portion 31*b* and provided with position setting pins 32 and 32′ fixedly connected thereto. Numeral 33 represents a lever restoration spring, and numeral 34 represents a cassette restoration spring. Although both springs are made of leaf springs in this embodiment, any other types of springs may be employed. The paper cassette 17 is formed with an inclined plane 17*b* and position setting step portions 17*c* and 17*c*′. By holding the pull 17*a* and inserting the paper cassette 17 along the cassette guides 29 and 30, the position setting pins 32 and 32′ come into contact with the inclined plane 17*b* of the cassette 17, thereby pushing down the release lever 31. With a further advancement of the paper cassette 17, one end 17*d* of the cassette 17 is brought in charge of the cassette restoration spring 34 until at last the position setting pins 32 and 32′ are engaged with the cassette grooves or step portions 17*c* and 17*c*′ to thereby set the position for the cassette 17. The release of the cassette 17 can be effected by swinging downward the cassette release knob 18 fixedly connected by tight insertion into the knob attaching portion 31*b*.

Numerals 35 and 36 represent circuit boards mounted on which are electronic components forming such as sequence controller, image processing circuit system, and television interface. The circuit boards 35 and 36 are disposed under the main frame 20, which circuit boards are accessible for the maintenance purpose by removing the bottom cover 3.

Figure 7:
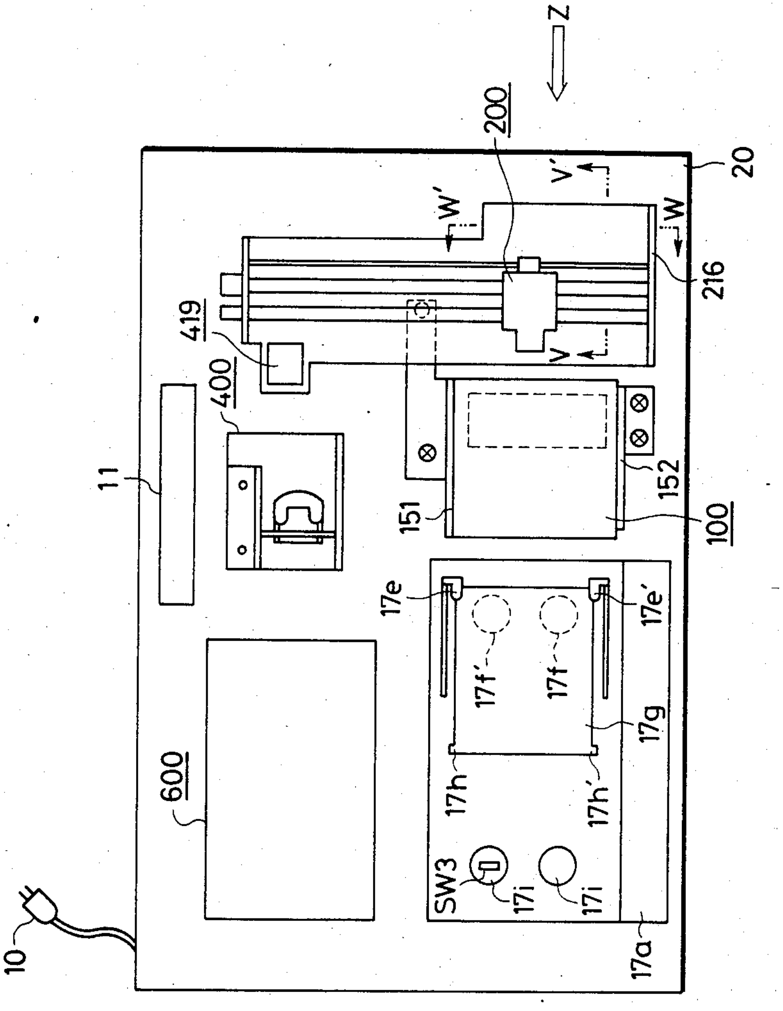
FIG. 7 is a top view of the apparatus of FIG. 1, wherein an upper cover is dismounted from the apparatus.

In FIG. 7, numeral 400 represents a pump unit of a restoration system for the printer, numeral 419 represents a capping unit for recording heads, and numeral 600 represents a power source unit, all of them being fixedly mounted on the main frame 20.

(Stacker)

The stacker 5 is detachably mounted on the printer as described previously and is moved to slide a little in the arrow direction in FIG. 1 by releasing the stacker release knob 8. With a further pull-out of the stacker 5 in the arrow direction, the stacker itself is completely removed from the printer. Incorporation of the detachable structure for the stacker 5 is aimed at taking away jammed papers when troubles such as jammed papers in the printer occur. A switch SW8 (FIG. 5) is provided for judging whether the stacker 5 is mounted or not. It is needless to say that if the stacker 5 is taken away, the paper feeder system and recording system can not be driven into operation even if the print start operation button is depressed. The upper portion of the stacker 5 is formed with a transparent upper plate 5*a* so that the printing operation can be monitored exteriorly of the apparatus from the upper or slanted upper position. The transparent upper plate 5*s* is provided with a pivot 5*b* so as to rotatively mount it on the stacker 5. Printed recording papers within the stacker 5 may be took out either by turning the transparent upper plate 5*a* or through an opening 5*f* formed in the front face of the apparatus for such purpose. In other words, in view of the characteristic features of the invention that the operations can be managed through only a single front side of the apparatus, printed recording papers can be taken out without turning the transparent upper plate 5*a*. In addition, part of the transparent upper plate 5*a* is cut away for easy access of fingers.

It is noted here that in order to pull out recording papers, the bottom portion 5*c* of the stacker 5 is formed with an inclined plane which gradually goes upward as it moves away from a paper withdrawal roller 124 described later. The reason why the space to the bottom of the stacker 5 is made deeper at the side of the paper withdrawal roller 124 is for accommodating as many curled printing papers as possible.

As seen from the above description, the stacker 5 of the present embodiment comprises the upper plate (5*a*) at the upper face and a loading plate (at the bottom face 5*c*) for piling up a recording medium of a sheet form, that is, a recording paper P. The upper face is generally even with the top face of the apparatus body, and the loading plane is inclined such that the space between the loading plane and upper plate becomes shorter in the withdrawal direction of a recording medium. Therefore, other apparatuses can be placed upon the recording apparatus, and the apparatus may be placed within a limited space. Furthermore, even if a recording medium curled in the direction perpendicular to the ejection direction is ejected, a large number of such recording mediums can be accommodated within the stacker. In FIG. 5, represented by reference SW10 is a switch for detecting the presence or absence of recording papers at the recording paper ejection outlet.

Paper Feeder Cassette

The paper feeder cassette 17 will be described in detail with reference to FIGS. 5, 6 and 7.

As is similar to those cassettes commonly used with copiers or the like, cut-sheet recording papers P can be set in the cassette 17, by pushing them from the upper side between separation nails 17*e* and 17*e'* and intermediate plate 17*g* against the forces exerted by restoration springs 17*f* and 17*f'*. The separation nails 17*e* and 17*e'* are pivotally mounted about supporting shafts (not shown), the pivotal range being restricted by stoppers (not shown) so as to prevent the recording papers P from protruding over the upper face of the cassette. The restoration springs 17*f* and 17*f'* act to push up the intermediate plate 17*g* and cut sheet recording papers P. The intermediate plate 17*g* is pivotally mounted about fulcrums 17*h* and 17*h'*. With the help of suitable contact pressures (F) of the restoration springs and the friction coefficient (u) of a paper feeder roller 120 described later, the recording papers P can be stably separated one by one. That is, the separation force between recording papers P is determined by the following inequality:

$$(u-up)F>0 \quad (1)$$

wherein up represents a friction coefficient between the papers. The restoration springs 17*f* and 17*f'* here used are of a conical shape. By virtue of the conical shape, the height of the spring becomes the diameter of coil wire of the spring when the intermediate plate 17*g* is depressed to the lowermost position, resulting in good accommodation of the recording papers P. In other words, it is very advantageous in that a number of recording papers P can be accommodated and the overall height of the printer can be lowered. It is desirable however in this case to design in such a way that the contact pressure (F) against the paper feeder roller 120 should be kept constant over the various heights of the piled-up cut sheet papers P.

Generally, if a conical coil spring is wound at a constant pitch, the relation between load and displacement of the spring is not in proportion to each other. Therefore, in the present embodiment, the conical compression spring is wound at an unequal pitch so that the contact pressure (F) against the paper feeder roller 120 is maintained substantially constant over the various heights of the piled-up cut sheet papers P. In particular, the pitch is made small where the diameters of windings of the coil spring are small, and the larger the winding diameter becomes, the pitch is made broader.

The conical coil springs 17*f* and 17*f'* as such are used as restoration springs. Therefore, the heights of the conical coil springs 17*f* and 17*f'*, when the intermediate plate 17*g* is depressed to the lowermost position and the coil springs are compressed, become equal to the diameter of coil wire of the springs. Consequently, it is possible to increase the number of sheet recording papers P to be accommodated within the cassette, and at the same time to miniaturize the paper feeder cassette. Reference 17*i* represents an aperture formed in the bottom of the paper cassette. Although two apertures are formed in the embodiment, one or more than two apertures are also possible. Since the printer of the present invention is made compact as a whole, the paper cassette 17 itself is also made small. That is, except that the pull 17*a*, the whole dimension is slightly larger than the size of the recording papers P. For instance, in the case that the recording papers P have inadvertently been set upside down, in the case that the recording papers P are to be pulled out which are impossible to be used because the papers have long been stored in the cassette 17 and suffered from deformation or change of quality, or in the case that other types of recording mediums are to be replaced with, fingers can be inserted through the aperture 17*i* and the recording papers P can be pushed upward to remove them from the cassette. In addition, by utilizing the aperture 17*i* and a switch SW3, it is possible to judge the presence or absence of the recording papers P. In this case, a reflection type optical sensor is preferable for the switch SW3, but any other type of detectors can be used.

As seen from the above embodiment, since the paper feeder cassette 17 is formed at the bottom thereof with the aperture 17*i* large enough to enable the insertion of a finger therethrough, the pull-out and replacement of the recording papers P can be carried out with ease. And in addition, it is sufficient if only the size of the cassette 17 is slightly larger than the size of the recording papers, to which the miniaturization of the paper feeder cassette 17 itself is attributable. In FIG. 5, reference SW4 represents a switch for detecting whether the cassette 17 is mounted or not.

Paper Feeding System

The flow of the recording paper P will be briefly described with reference to FIG. 5.

FIG. 5 shows a state that the paper cassette 17 and ink cartridge 12 have been mounted from the front side, wherein the paper feeding is carried out in the direction substantially perpendicular to the mounting direction of those cassette 17 and cartridge 12. In particular, as the paper feeder roller 120 rotates, the uppermost one of the recording papers P is separated, and the single sheet paper is fed between paper guides 143 and 146*a* until it abuts the junctions portion between the platen roller or platen 101 and the resist roller 103. Further, the sheet paper is delivered by the paper feeder roller 120 to form a loop between the paper feeder roller 120 and the resist roller 103. Thereafter, as described later, as the platen 101 is moved to rotate, the sheet paper is further delivered by tightly contacting with the platen 101 which is caused by a presser spring 102. The sheet paper is further fed by being held between the platen 101 and the pinch roller 104. In printing, the platen 101 feeds the recording paper P stepwise. After completion of printing, the recording paper P passes between paper guides 144 and 146 and is ejected by ejection roller pair 124 and 145 into the stacker 5 with the printed face direction upward.

The paper guides are made of transparent material, and also the upper plate 1*a* forming part of the apparatus frame is made of transparent material as already described. The guide member for passing the recording medium between the platen roller, and the portion forming part of the apparatus corresponding to the guide member, are both made of transparent material. Therefore, it is possible to grasp the printing quality immediately after the printing without touching the recording medium. Furthermore, it is possible to quickly have another try in printing or adjust the image characteristics, without deteriorating the paper feeding precision.

Paper Feeding Mechanism

The paper feeding mechanism will be described in detail.

Figure 8:
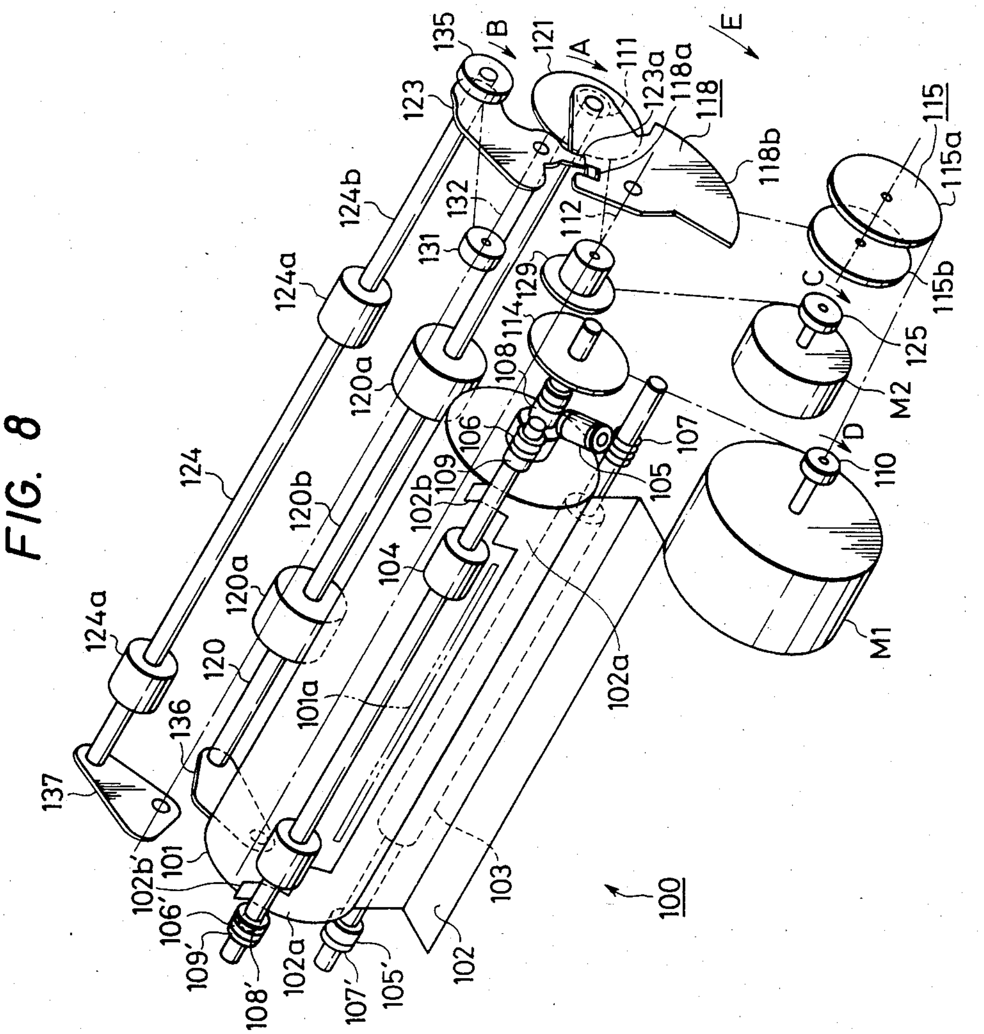
FIG. 8 is a first perspective view showing the environs about a platen.

In FIG. 8, numeral 101 represents the platen for feeding a sheet paper, the platen 101 being supported by not shown bearings mounted in side walls 151 and 152 (FIG. 7).

The platen 101 is made of for example elastic body such as rubber (the shaft of the platen is made of metal), however the material is not limited thereto. Numeral 102 represents the paper presser spring, which is fixed at one side thereof to a carriage base plate 216 (FIG. 7) described later. The curved portions 102*a* and 102*a'* (referred to as R portions hereinafter) are in contact with the platen 101 so as to impart a suitable contact pressure thereto. Guide portions 102*b* and 102*b'* guide the recording paper P near to the pinch roller 104 so as to make the recording paper P smoothly and without loosening thrust into the junction portion between the pinch roller 104 described later and the platen 101. The guide portions 102 and 102*b'* are not in contact with the platen 101, but have a slight clearance therebetween. Therefore, loosening in the recording paper P does not occur at the region from the R portions 102*a* and 102*a'* of the paper presser spring 102 to the junction portion between the pinch roller 104 and platen 101, resulting in the integral movement of the platen 101 and the recording paper P without causing any slip therebetween.

Numeral 103 represents the resist roller, which is rotatably supported by a paper guide 143 and contacts with the platen 101 at a contact pressure f1 by means of springs 105 and 105' (FIG. 5) through sleeves 107, 108, and 107, 107'. In the present embodiment, the junction portion between the platen 101 and the pinch roller 103 is constructed to extend over the whole width of the recording paper. The reason for this is to prevent any creases or folds in the recording paper, at the time when even a deformed recording paper such as a curled paper comes to the junction portion and the top end of the paper is aligned at the junction portion.

Numeral 104 represents the pinch roller, which is rotatably supported by a transparent paper guide. The pinch roller 104 is in contact with the platen at a contact pressure f2 by means of springs 106 and 106' (FIG. 5) through sleeves 109, 108 and 109', 108'. The junction portions between the pinch roller 104 and the platen 101 are disposed only at the vicinity of the guide portions 102 and 102' of the paper presser spring 102 described previously, that is, disposed only at both end portions of the recording paper P. This arrangement has been made in view of the fact that the middle portion of the recording paper P is fed slightly floating up from the platen 101 due to the cutaway portion formed in the paper presser spring 102 at the printing position. In particular, if the junction portions are so arranged to have a contact over the whole width of the recording paper as in the case of the resist roller 103, creases in the recording paper may arise in this case. This is because only opposite end portions as above are subjected under pressure.

By virtue of the provision of the platen 101, paper presser spring 102, resist roller 103, and pinch roller 104, the feeding precision for the recording paper, the evenness in the recording section, and the like can be assured. More in particular, the top end of a recording paper which have been aligned by the platen 101 and resist roller 103, is fed under rotation of the platen 101 between the platen 101 and paper guide 143 (FIG. 5); and in turn further fed between the R portions 102*a* and 102*a'* of the paper presser spring 102 and the platen 101. Up to this position, the wound angle of the recording paper relative to the platen 101 is small, a suitable clearance between the platen 101 and the paper guide 143 exists, and the recording paper P is pushed into between the platen 101 and resist roller 103. Therefore, it is not assured that the recording paper P is fed without any slip between the platen 101. At the region from the R portions 102*a* and 102*a'* of the paper presser spring 102 to the guide portions 102*b* and 102*b'*, and the pinch roller 104, the recording paper P is fed in tight contact with the platen 101. At the next region, the recording paper 101 is rolled up by the platen 101 and the pinch roller 104. At the succeeding region from the R portions 102*a* and 102*a'* at the printing position to the platen 101 and the pinch roller 104, the recording paper is maintained in tight contact and moreover a large wound angle is ensured. Considering the above conditions, there is no slip between the recording paper P and the platen 101, but both are fed as a unit. In addition, a sufficient evenness at the printing position can be assured. As well known, if a sufficient evenness is not obtained, the recording paper P may contact with the heads described later, or because of scatterings of distances between the heads and the recording paper P, a drop of ink jetted out of the head may be bombarded onto a position displaced from a target along a main scanning direction. Thus, the quality of printing is degraded. Further, as to the feeding precision of the platen 101 along the sub-scanning direction, if there is any slip between the recording paper P and the platen 101, displacement from the target bombardment point along the sub-scanning direction may also occur.

Further in the present embodiment, the instability of the platen 101 due to vibrations from such as a motor M1 is eliminated under the pressure exerted by springs 105, 105', and 106, 106'. In particular, the platen 101 is made to have a suitable load as seen from the driver side so that even if there is play such as a backlash of gears in the platen drive mechanism, the platen 101 may not fluctuate to thereby perform a sufficient position setting function.

The reason that the sleeves 107, 107', 108, 108', 109, and 109' are used for setting the springs, is to eliminate twists, tangles, or the like of the springs 105, 105', 106, and 106', which might otherwise caused by the rotation of the platen 101, and to obtain a smooth rotation of the platen 101. The material of the sleeves is preferably a low friction coefficient material such as plastics.

The relation between contact pressures f1 and f2 is preferably set so as to suffice:

$$f1 < f2 \qquad (2)$$

in view of the paper feeding precision and stability. In the present embodiment, the platen 101 is made of rubber, while the resist roller 103 and pinch roller 104 are made of metal. In addition, the spring forces of the springs 105, 105' and 106, 106', was changed so as to satisfy the inequality (2). Since the purpose of the inequality (2) is to make the platen 101 and the pinch roller 104 as the main drive for the paper feeding, the following structure is also applicable. That is, a spring is suspended between the resist roller 103 and the pinch roller 104 through sleeves. Of course, independent springs may be suspended as in the present embodiment, or different spring forces may be employed for each spring. In the structure, materials for the pinch roller 104 and the resist roller 103 are changed, and the friction coefficient of the pinch roller 103 is set larger than that of the resist roller 103.

Without the pinch roller 104, for instance, the top end of the recording paper P may get into the stacker 5, and in this condition if the top end of the recording paper P comes into contact with the stacker, then the position precision of the paper P under printing is influenced. In this connection, since a heavy loaded spring is suspended between the platen 101 and the pinch roller 104 to serve as a main drive, the printing precision is less susceptible to external influences during printing operation. In FIG. 5, references SW1 and SW2 respectively represent switches for detecting the presence or absence of recording papers near the corresponding rollers 103 and 104.

Drive Mechanism for Paper Feeding

Next, the drive mechanism for paper feeding will be described with reference to FIG. 8.

First, the rotation of the platen 101 will be described. Reference M1 represents a pulse motor, and numerals 110 and 114 represent gears for transmitting the rotation of the pulse motor M1 to the platen 101. The gear ratio is determined by the advance angle of the pulse motor M1. These gears are rotatably supported on and about the respective shafts fixed to a side wall 151 (FIG. 7).

Next, the paper feeding section will be described.

Numeral 115 represents a known friction clutch which is constructed of gears 115*a* and 115*b* and springs (not shown). The gear 115*a* is coupled to the motor M1 by means of not shown gears, while the gear 115*b* is meshed with a gear 118*b* of a sector gear 118 via a gear 116*b*, and is rotatably supported on the side wall 151. The sector gear 118 is formed with a cutaway portion 118*a*. The sector gear 118 concentrically with a gear 129 described later is rotatably supported on the side wall 151 (FIG. 7). The gear 129 is rotatably supported on the side wall 151 and coupled to a motor M2 through a gear 125.

The shaft 120*b* of the paper feeder roller 120 is rotatably supported by the sector gear 118. Therefore, the shaft 120*b* swings up and down under rotation of the sector gear 118. Numeral 121 represents a gear which is coupled to the paper feeder roller shaft 120*b* via a one directional clutch 111 and is coupled to the gear 129 via a not shown gear. As a result, the paper feeder roller 120 is driven into rotation only in the arrow A direction in response to the one directional (the arrow C direction) rotation of the motor M2, with the aid of the paper feeder roller 120, gears 125, 129, and 121, and one directional clutch 111. Even if the sector gear 118 rotates, the coupling between the gears 129 and 121 is not hindered since the sector gear 118 rotates concentrically with the gear 129.

The paper feeder roller 120 is constructed of a metallic shaft 120*b* and an elastic roller portion 120*a* fixed thereto and made of such as rubber. The paper feeder roller 120 is supported between the sector gear 118 and an oppositely located and rotatable side wall 136. In particular, under operation of the pulse motor M1, the roller portion 120*a* moves while swinging up and down and the roller 120 as a whole rotates under operation of the motor M2. The two movements are independently controlled. The side wall 136 is rotatably supported by a side wall 151.

Now, the drive section of the ejection roller 124 will be described. The ejection section is constructed of a side wall 123 with a curved portion 123*a*, side wall 137 confronting the side wall 123, gears 131, 135, and ejection roller 124. The side walls 123 and 137 are rotatably supported by the side walls 151 and 152 shown in FIG.

7, respectively. The ejection roller 124 is constructed of a metallic shaft 124*b* and an elastic roller portion 124*a* fixed to the shaft 124*b*. The ejection roller 124 is rotatably supported by the side wall 123 and side wall 137 confronting the side wall 123.

The gear 131 is rotatably supported by the side wall 151 and is coupled to the gear 129 through a gear (not shown) and to the motor M2. The gear 131 meshes through a not shown gear train with a gear 135 fixedly mounted on the ejection roller shaft 124*b*. Consequently, the rotation of the motor M2 is transferred to the gear 135. In this case, by adjusting the number of gears, the motor is so arranged to rotate reversely relative to the paper feeder roller 120. In particular, as the motor M2 is driven into rotation in the direction opposite to the drive direction (arrow C) of the paper feeder roller, the ejection roller 124 rotates in the arrow B direction, that is, in the withdrawal direction of recording paper P. The side wall 123 concentrically with the gear 131 is rotatably supported on the side wall 141, while the curve portion 123*a* engages with the cutaway portion 118*a* of the sector gear 118. Therefore, upon rotation of the sector gear 118, the side wall 123 rotates about the supporting shaft, while the ejection roller shaft 124*b* swings up and down.

Under operation of the motor M1, if the sector gear 118 rotates in the arrow E direction, the paper feeder roller shaft 120*b* moves downward, while the ejection roller shaft 124*b* moves upward. Thus, an enable state for paper feeding is brought about. In contrast, if the sector gear 118 rotates in the reverse direction, then the respective roller shafts 120*b* and 124*b* move in the opposite directions to respective retreat positions. In the paper feeding enable state, if the motor M2 rotates in the arrow C direction, the paper feeder roller 120 rotates in the paper feeding direction (arrow A) with the aid of the gear 121 to thereby perform paper feeding. At this time, although the ejection roller 124 rotates in the direction opposite to the withdrawal direction, there is no problem since the recording paper P is not present at the ejection roller at that time.

Thereafter, the recording paper P is fed by the platen 101. At the time of withdrawal, the motor M2 rotates in the direction opposite to the arrow C, and the ejection roller 125 rotates in the withdrawal direction. The paper feeder roller 120, on the other hand, does not rotates due to the provision of the one directional clutch 111 and gives no influences upon the withdrawal operation.

Although the side wall 123 and the sector gear 118 have been described as separated members for the simplicity of description, the single integrated member can also be used. In this case, the rollers 120 and 124 do not move to opposite directions, but they move to the same direction.

Release and Reset Mechanism for Resist and Pinch Rollers

Figure 9:
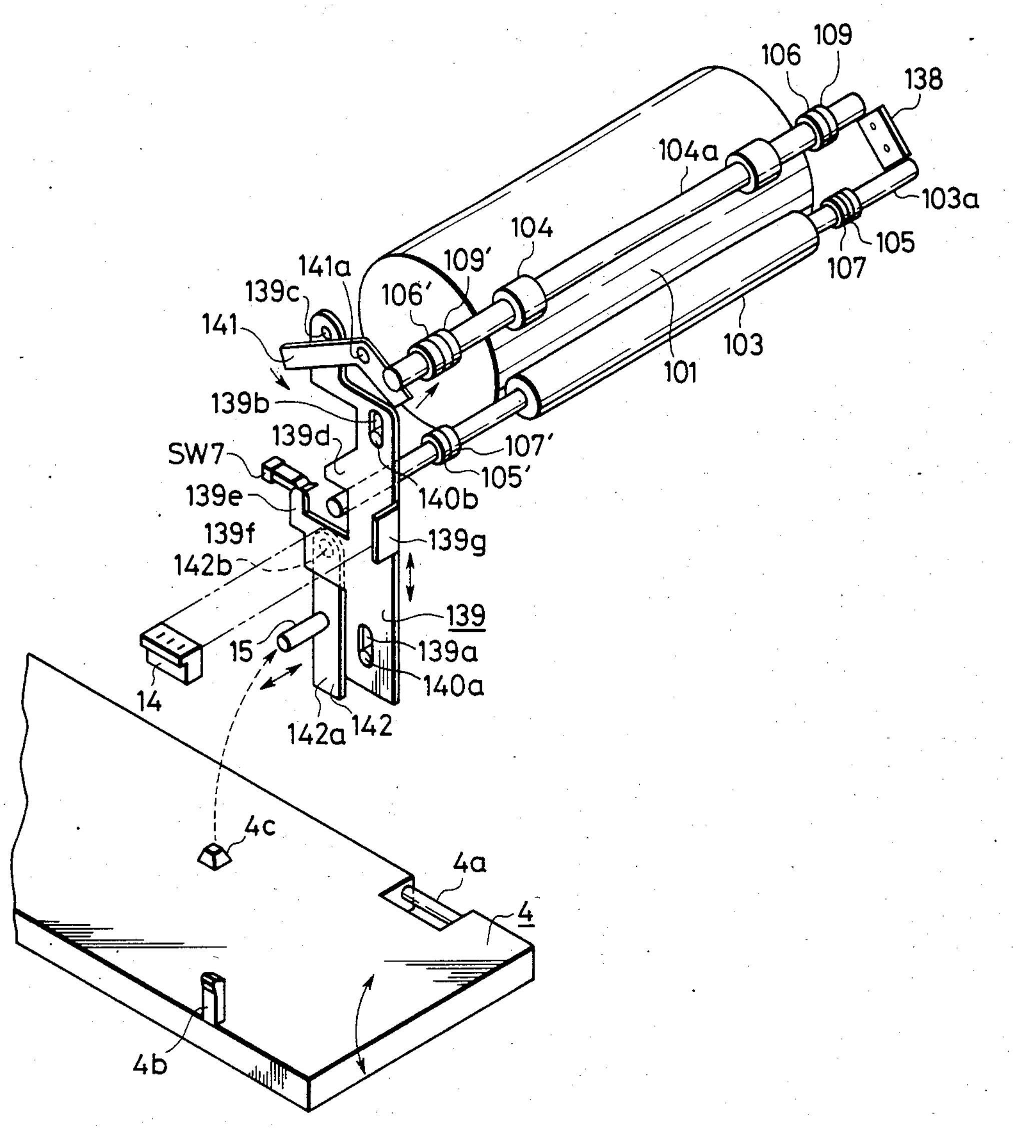
FIG. 9 is a second perspective view showing the environs about the platen.

The release and reset operations for the pinch and resist rollers 104 and 103 brought into tight contact with the platen 101 will be described with reference to FIG. 9.

Numeral 138 represents a stopper for releasing the pinch roller 104 and the resist roller 103, which stopper is fixed on the side wall 151.

Numeral 139 representes a release lever slidably supported to the side wall 152 by means of pins 140*a*, 140*b*, guide grooves 139*a*, 139*b*. The release lever 139 is constructed of an operation section 139*g* (curve portion) coupled to the release knob 14 (FIGS. 3 and 4) by means of not shown members, pin 139*c*, arm portion 139*d*, switch operation section 139*e*, and stopper section 139*f*. Switch SW7 is a switch which turns on at the set position (recording position) of the pinch roller 104 and the resist roller 103.

Numeral 141 represents a lever rotatably supported about a shaft 141*a*, and numeral 142 represents a leaf spring the lower end 142*a* of which is fixed to the side wall 152. A stopper pin 142*b* and the reset button 15 (FIGS. 3 and 4) are fixed at the middle and the upper end of the lever 141, respectively. Numeral 4 represents the front cover, reference 4*a* represents a hinge coupled to the main body of the apparatus, reference 4*b* represents a lock nail, and reference 4*c* represents a protrusion portion fixed at the position for depressing a reset button 15 as the front cover 4 is rotated about the hinge 4*a* so as to close it.

(1) Release Operation for Pinch and Resist Rollers

It is necessary to make it easy to pull out jammed recording papers P. In such case, by pushing down the release knob 14, the release lever 139 slides down with the help of the guide grooves 139*a*, 139*b*, and the pins 140*a*, 140*b*. At that time, the pin 139*c* pushes the lever 141 to make it rotate about the shaft 141*a* counter-clockwise and push up the pinch roller 104. At the same time, the arm section 139*d* pushes down the resist roller 103. Then, one end of both roller shafts 141*a* and 103*a* are pulled away from the platen 101 using the end face of the stopper 138 as a fulcrum. Upon further depression of the release lever 139, the pin 142*b* of the leaf spring 142 is ridden upon the stopper section 139*f* by its own spring force.

With these operations, the contact between the platen 101 and the pinch and resist rollers 104 and 103 is intercepted so that the paper entangled around the platen 101 can readily be removed therefrom.

(2) Reset Operation for Pinch and Resist Rollers

Next, after the removal of the entangled paper, in order to set respective rollers 103 and 104 at the recording position (as shown in the figure), the reset button 15 is pushed down against the spring force of the leaf spring 142. With this operation, the contact between the stopper pin 1432*b* and the stopper section 139*f* is intercepted. Thus, by virtue of the spring forces of the springs 105, 105', 106, and 106', the pinch roller 104 and the resist roller 103 contact with the platen 101 to return to the initial position. Concurrently therewith, the lever 141 rotates with the help of the roller shaft 104*a* to thereby push up the pin 139*c* and hence the release lever 139. So, the switch SW7 turns on and each member is set at the recording position as shown in the figure.

The above operations are actuated by the operator by depressing the reset button 15. However, since the protrusion portion 4*c* on the inner surface thereof pushes the button 15 also in the case the front cover 4 is closed, the mere closing operation of the front cover 4 enables to set the rollers. As above, both rollers 103 and 104 return to the recording position.

It is seen from the above that without positively depressing the button 15, both rollers 103 and 104 can be automatically reset by merely closing the front cover 4.

Heads and Ink Supplying System

Next, heads and the ink supplying system 200 of the present embodiment will definitely be described.

Figure 10:
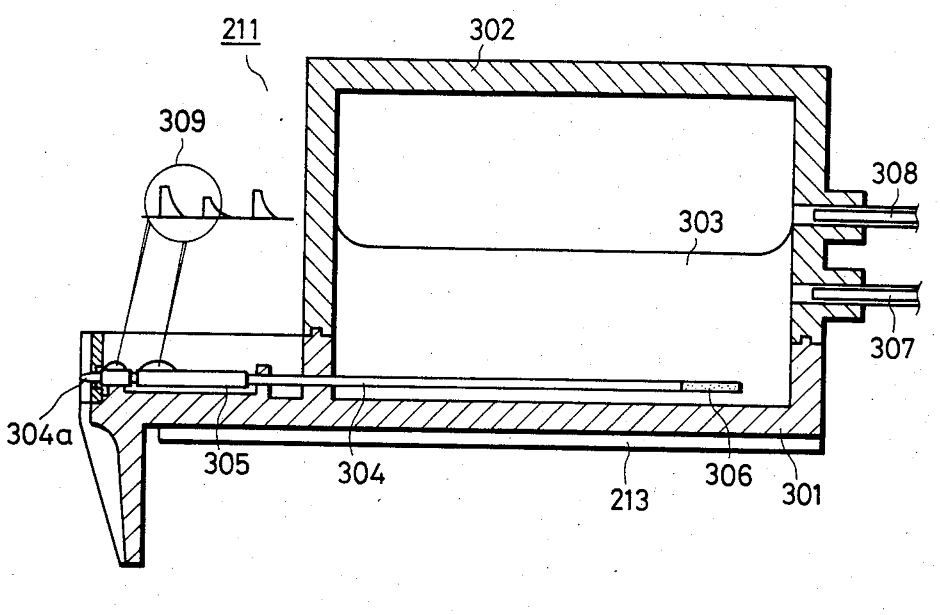
FIG. 10 is a cross sectional view of an ink-jetting head unit.

As particularly shown in FIG. 10, the basic structure of each head of a head unit 211 includes a sub tank body 301 and a sub tank lid 302 integrally mounted to the tank body 301. In the present embodiment, there are provided four (Y: yellow, M: magenta, C: cyanine, B: black) independent ink reservoirs 303 along the direction perpendicular to drawing surface. Each ink reservoir has a corresponding nozzle unit mounted. The nozzle unit is constructed of a tubular nozzle 304 made of such as glass, tubular piezoelectric element 305 (electric-mechanical pressure transducer) connected with adhesive around the nozzle 304, and filter 306 for preventing mixing foreign minute matter into the nozzle 304 and adjusting the flow resistance of ink. By applying a drive pulse 309 to the piezoelectric element 305, the nozzle 304 contracts unitedly with the piezoelectric element 304 to thereby jet out ink drops from the orifice 304*a* formed at the tip thereof.

Numeral 307 represents an ink supply tube for supplying ink in an ink tank bag 355 housed within the ink cartridge 12, and numeral 308 represents a restoration tube communicating with a pump unit 400 for restoring for example a clogged state of the nozzle 304.

In order to avoid an unstable condition in ink jetting due to the change of the characteristics (particularly, drastic variation in viscosity) of ink under a low temperature, a heater 213 is attached beneath the sub tank body 301 of the head unit 211. The heater 213 maintains the temperature of the ink in the sub tank constant by driving a control circuit (not shown) in accordance with the temperature of the ink itself or the atmosphere measured with a temperature measuring element such as a thermistor (not shown).

The detailed construction of the ink cartridge 12 and the mounting and dismounting to the printer will be described in detail.

Figure 11:
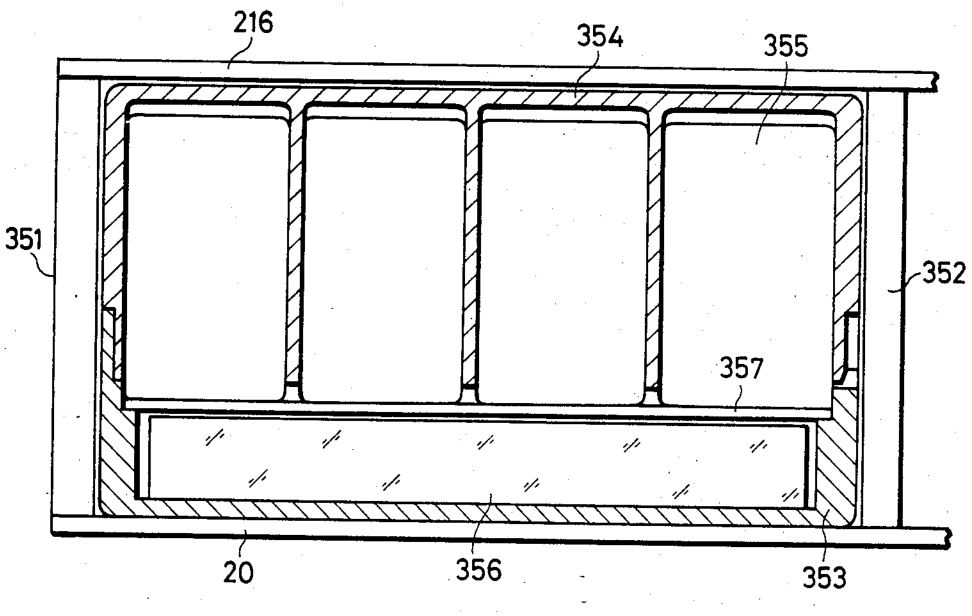
FIG. 11 is a cross sectional view of an ink cartridge cut along a line V–V' of FIG. 7.
Figure 13:
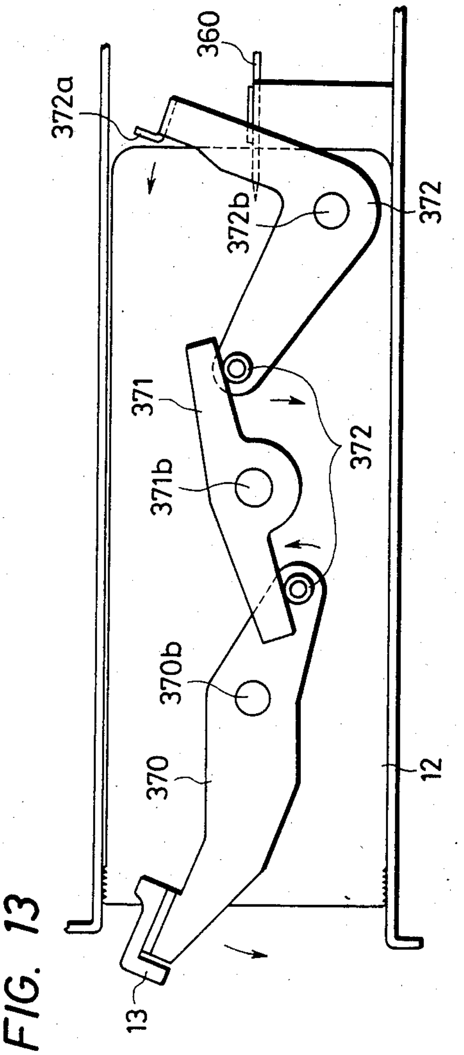
FIG. 13 is a view showing a dismounting mechanism for the ink cartridge.

Referring to FIG. 11, the ink cartridge 12 is inserted from the operation side of the apparatus (FIGS. 3 and 4) into the space defined by the main frame 20, carriage base plate 216, and right and left guide plates 351 and 352. FIG. 11 is a cross sectional view along a line W—W' of FIG. 7, which shows a state that the ink cartridge 12 is housed to form an ink supply passage. FIG. 13 shows an arrangement how the ink cartridge 12 is removed from the printer, which is shown as seen from the Z direction in FIG. 7.

Figure 12:
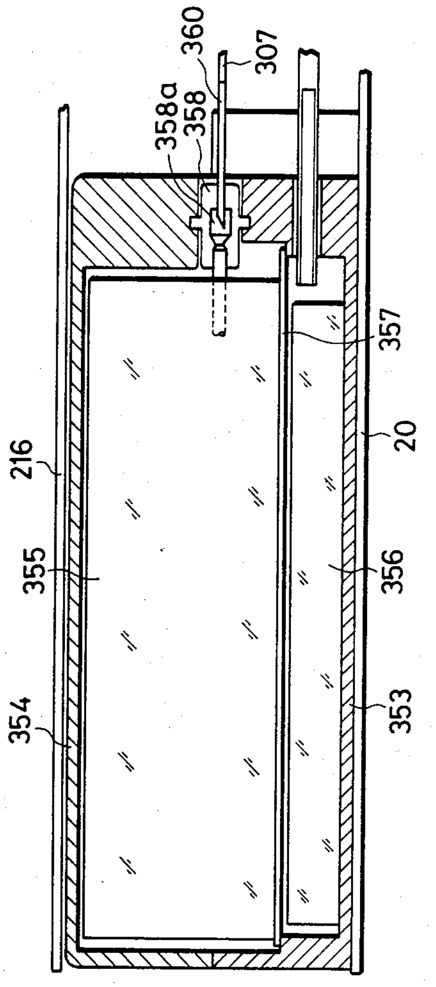
FIG. 12 is a cross sectional view of the ink cartridge cut along a W–W' of FIG. 7.

Referring to FIGS. 11 and 12, the ink cartridge 12 is constructed of a cartridge main body 353, cartridge lid 354, main tank bags 355 for containing inks of various colors Y, M, C, and B, waste ink absorber 356, and partition plate 357. In the present embodiment, the main tank bags 355 including four (Y, M, C, B) bags are housed in the longitudinal direction (or perpendicular direction relative to the drawing surface), and the waste ink absorber 356 is positioned below the main tank bags 355 separated by the partition plate 357. The coupling between the cartridge main body 353 and the cartridge lid 354 is effected during the assembly process for mounting both members integrally by means of a known nail method.

At one end of the main tank bag 355, a rubber plug 358 is attached integrally with the main tank bag 355. The rubber plug 358 is fixedly held between the cartridge main body 353 and the cartridge lid 354.

The ink cartridge 12 is mounted onto the printer by directing the rubber plug 358 side to the interior of the printer. In this case, a hollow needle 360 fixed at the printer body penetrates the rubber plug 358 to extend into an ink chamber portion 358*a* in the rubber plug. Therefore, a necessary ink supplying passage is completed to supply ink to the ink reservoir 303 of the head unit 211 through a flexible supply tube 307. The waste ink absorber 356 is for absorbing waste ink from the restoration system described later. The supply of ink from the main ink tank bags 355 to the respective four ink reserviors 303 is performed through the respective four flexible supply tubes 307. In particular, every time a one drop of ink is jetted out, the ink is supplied to the ink reservoir 303 from the main tank bag 355 under the capilary action. The other end of the flexible supply tube 307 is coupled to a hollow needle 360 fixed to the printer body at the position almost near to the middle of the carriage running span. As described above, the rubber plug 358 attached at the end of the main tank bag 355 is made to couple to the hollow needle 360 as the ink cartridge 12 is driven into the mounting state. Thus, the tip of the hollow needle 360 reaches the hollow portion in the rubber plug 358 to which ink has already been filled, thereby completing an ink passage.

Next, the removal of the ink cartridge 12 from the printer main body will be described.

In FIG. 13, numeral 13 represents the release knob for releasing the ink cartridge, and numerals 370, 371, and 372 represent levers turning about respective shafts 370*b*, 371*b*, and 372*b*. The lever 372 is formed with a presser face 372*a* which contacts with the ink cartridge surface at the side of the rubber plug for the purpose of pushing out the ink cartridge 12. By pushing down the knob 13, the levers 370, 371, and 372 are respectively pivoted in the arrow directions to thereby urge the presser face 372*a* to push out the ink cartridge 12 toward the operation side.

It is noted that it is very difficult to pull out the ink cartridge 12 once it has been completely housed within the printer main body. The reason is that no marginal portion exists for accessing with fingers to the ink cartridge 12 and that it requires a large strength more than expected to pull out the hollow needle 360 from the rubber plug 358. In view of the above, in the present embodiment, cooperative motions of the levers are utilized for the removal of the cartridge so that with a small strength the coupling between the hollow needle 360 and the rubber plug 358 may be released. Thereafter, by virtue of the structure of the embodiment, the ink cartridge 12 can be pulled out by hand. Once the rubber plug 358 of the ink cartridge 12 is removed from the hollow needle 360, the ink cartridge 12 slightly (for example, in the order of 30 mm) projects out of the printer main body. Thereafter, therefore, the ink cartridge 12 can easily and lightly be pulled out by hand. In FIG. 5, reference SW5 represents a switch for detecting whether the ink cartridge is mounted or not.

What is claimed is:

1. A recording apparatus for recording with ink on a sheet-form recording medium, said apparatus comprising a housing having a generally box shape with one side surface extending along the bottom surface, said housing having therein:

(A) a recording medium mounting section for mounting said recording medium;

(B) an ink mounting section for mounting a member containing said ink;

(C) a recording medium accommodating section for accommodating said recording medium already printed; and (D) operating means for use in operating said apparatus, wherein said recording medium mounting section, ink mounting section, and printed recording medium accommodating section each have an opening on said side surface of said housing and said operating means is disposed on said side surface.

2. A recording apparatus according to claim 1 further comprising a cover member for covering said side surface said cover member being arranged to cover at least said recording medium mounting section and ink mounting section.

3. A recording apparatus according to claim 1 further comprising display means for displaying an operation state of said apparatus, said display means being disposed at said side surface.

4. A recording apparatus according to claim 3 further comprising a cover member for covering said side surface, said cover member being arranged to cover at least said recording medium mounting section and ink mounting section.

5. A recording apparatus according to claim 1, wherein said recording medium accommodating section is constructed as a stacker unit which is detachable to said apparatus.

6. An ink jet recording apparatus for recording with a liquid ink contained in a detachable ink cartridge onto a recording paper accommodating within a detachable recording paper cassette, said apparatus comprising a housing having a generally box shape with one side surface extending along the bottom surface, said housing containing therein:

(A) recording means for recording with said ink on said recording paper at a predetermined recording position;

(B) a first mounting section for mounting said recording paper cassette;

(C) a stacker for accommodating a printed recording paper;

(D) an automatic recording paper feeding and withdrawing mechanism for feeding recording paper from said recording paper cassette mounted on said first mounting section to said recording position of said recording means, and feeding printed recording paper from said recording means to said stacker;

(E) a second mounting section for mounting said ink cartridge; and (F) operating means for use in operating said apparatus, wherein said first and second mounting sections and said stacker each have an opening on said side surface of asid housing and said operating means is disposed on said side surface.

7. A recording apparatus according to claim 6, wherein said stacker is constructed as detachable to said apparatus and a recording paper can be pulled through said opening out of said stacker.

8. A recording apparatus according to claim 7, further comprising a cover member for covering said openings of said first and second mounting sections and part of said operation means.

9. A recording apparatus according to claim 7, further comprising display means for displaying an operation state of said apparatus, said display means being disposed at said side surface.

10. A recording apparatus comprising:

recording means for recording a visual image onto a sheet-form recording medium;

feeding means for feeding a recording medium to said recording means during operation of said recording means;

a guide member for guiding a printed portion of the recording medium;

accommodating means for accommodating said recording medium already printed, said accomodating means having a cover made of a transparent material, which cover covers the upper surface of the recording medium already printed, is rotatably mounted and has a cut-out portion; and an apparatus frame for housing said recording means, said feeding means, said accommodating means and said guide member, wherein said cover is formed so that said apparatus frame and said cover are continuous and said guide member and at least the portion of said apparatus frame facing said guide member are transparent.

11. A recording apparatus according to claim 10, wherein said recording means is arranged to record with ink a visual image onto a recording medium.

12. A recording apparatus according to claim 11, wherein said feeding means includes a platen roller, and said recording means is arranged to record a visual image onto a recording paper wound about said platen roller.

13. A recording apparatus according to claim 12, wherein said guide member is mounted between said platen roller and said accommodating means.

14. A recording apparatus according to claim 13, wherein said accommodating means is consturcted as a stacker detachable from said apparatus.

* * * * *

UNITED STATES PATENT AND TRADEMARK OFFICE
CERTIFICATE OF CORRECTION

PATENT NO. : 4,698,650

DATED : October 6, 1987

INVENTOR(S) : YOSHITAKA WATANABE, ET AL.

It is certified that error appears in the above-identified patent and that said Letters Patent is hereby corrected as shown below:

IN THE DRAWINGS

Sheet 3, Fig. 4, "6Kd" (between "6Ka" and "6Kc") should read --6Kb--.

AT [57] IN THE ABSTRACT

Line 5, "have" should read --having--.

COLUMN 1

Line 53, "convered" should read --covered--.
Line 67, "accomodated" should read --accommodated--.

COLUMN 2

Line 22, "necessiates" should read --necessitates--.

COLUMN 3

Line 66, "5" should be deleted.

COLUMN 4

Line 60, "a" should read --an--.
Line 62, "becomes" should read --comes--.

COLUMN 5

Line 24, "an" should read --a--.
Line 68, "a W-W'" should read --a line W-W'--.

UNITED STATES PATENT AND TRADEMARK OFFICE
CERTIFICATE OF CORRECTION

PATENT NO. : 4,698,650

DATED : October 6, 1987

INVENTOR(S) : YOSHITAKA WATANABE, ET AL.

It is certified that error appears in the above-identified patent and that said Letters Patent is hereby corrected as shown below:

COLUMN 6

Line 19, "plate 1." should read --plate 1a.--.
Line 19, "plate 1" should read --plate 1a--.
Line 21, "withdraw;" should read --withdrawal;--.
Line 46, "1" should read --01--.
Line 59, "it happens" should read --there occurs--.

COLUMN 8

Line 28, "slidable" should read --be slidable--.

COLUMN 9

Line 27, "5s" should read --5a--.
Line 29, "took" should read --taken--.

COLUMN 10

Line 62, "that" should read --for--.

COLUMN 12

Line 28, "107, 107'." should read --107', 108'.--.
Line 61, "have" should read --has--.

CERTIFICATE OF CORRECTION

PATENT NO. : 4,698,650

DATED : October 6, 1987

INVENTOR(S) : YOSHITAKA WATANABE, ET AL.

It is certified that error appears in the above-identified patent and that said Letters Patent is hereby corrected as shown below:

COLUMN 13

Line 9, "101" (first occurrence) should read --P--.
Line 17, "As well" should read --As is well--.
Line 41, "otherwise caused" should read --otherwise be caused--.
Line 46, "suffice:" should read --satisfy:--.
Line 65, "103" should read --104--.

COLUMN 15

Line 20, "141," should read --151,--.
Line 47, "rotates" should read --rotate--.
Line 54, "to" (both occurrences) should read --in--.

COLUMN 16

Line 49, "1432b" should read --142b--.

COLUMN 17

Line 9, "C: cyanine," should read --C: cyan,--.
Line 21, "304" should read --305--.

COLUMN 18

Line 14, "one" should be deleted.
Line 16, "capilary" should read --capillary--.

UNITED STATES PATENT AND TRADEMARK OFFICE
CERTIFICATE OF CORRECTION

PATENT NO. : 4,698,650

DATED : October 6, 1987

INVENTOR(S) : YOSHITAKA WATANABE, ET AL.

It is certified that error appears in the above-identified patent and that said Letters Patent is hereby corrected as shown below:

COLUMN 19

Line 11, "1 further" should read --1, further--.
Line 13, "surface said" should read --surface, said--.
Line 17, "1 further" should read --1, further--.
Line 22, "3 further" should read --3, further--.

COLUMN 20

Line 5, "asid" should read --said--.
Line 11, "claim 7," should read --claim 6,--.
Line 16, "claim 7," should read --claim 6,--.
Line 54, "consturcted" should read --constructed--.

Signed and Sealed this

Twelfth Day of April, 1988

*Attest:*

DONALD J. QUIGG

*Attesting Officer*

*Commissioner of Patents and Trademarks*